(12) United States Patent
Ito et al.

(10) Patent No.: US 8,095,946 B2
(45) Date of Patent: Jan. 10, 2012

(54) OPTICAL DISK MOTOR AND DISC DRIVING DEVICE INSTALLING THE OPTICAL DISK MOTOR (75) Inventors: Haruhiko Ito, Kyoto (JP); Hitoshi Takaki, Kyoto (JP); Toshihide Sonoda, Kyoto (JP); Takuya Yamane, Kyoto (JP)

(73) Assignee: Nidec Corporation, Kyoto (JP)

( * ) Notice: Subject to any disclaimer, the term of this patent is extended or adjusted under 35 U.S.C. 154(b) by 1197 days.

(21) Appl. No.: 11/491,965

(22) Filed: Jul. 25, 2006

(65) Prior Publication Data
US 2007/0028255 A1 Feb. 1, 2007

(30) Foreign Application Priority Data

Jul. 26, 2005 (JP) ................................ 2005-215437
Jul. 5, 2006 (JP) ................................ 2006-185842

(51) Int. Cl.
*G11B 7/24* (2006.01)
(52) U.S. Cl. ....................................................... 720/706
(58) Field of Classification Search .................... 720/706
See application file for complete search history.

(56) References Cited

U.S. PATENT DOCUMENTS

| 4,705,279 | A | * | 11/1987 | Mizukami et al. | 279/2.02 |
| 4,786,997 | A | * | 11/1988 | Funabashi et al. | 720/705 |
| 4,841,517 | A | * | 6/1989 | Kurihara et al. | 720/723 |
| 5,646,934 | A | * | 7/1997 | Mizuno et al. | 720/696 |
| 5,751,688 | A | | 5/1998 | Mizuno et al. | |
| 6,118,747 | A | | 9/2000 | Van Rosmalen | |
| 6,208,613 | B1 | | 3/2001 | Iizuka | |
| 6,353,591 | B1 | | 3/2002 | Kato | |
| 7,015,611 | B2 | | 3/2006 | Tokunaga et al. | |
| 7,461,391 | B2 | | 12/2008 | Yoo | |
| 2001/0038250 | A1 | | 11/2001 | Katagiri et al. | |
| 2002/0084704 | A1 | | 7/2002 | Fukutani et al. | |
| 2004/0154036 | A1 | | 8/2004 | Saito | |
| 2004/0232781 | A1 | | 11/2004 | Yoo | |
| 2005/0223400 | A1 | | 10/2005 | Matsushita et al. | |
| 2006/0022621 | A1 | | 2/2006 | Mine et al. | |
| 2006/0087184 | A1 | | 4/2006 | Kuyama et al. | |
| 2006/0284497 | A1 | | 12/2006 | Takaki et al. | |
| 2007/0013239 | A1 | | 1/2007 | Park | |
| 2007/0061827 | A1 | | 3/2007 | Dupper et al. | |
| 2007/0150911 | A1 | | 6/2007 | Kim | |

(Continued)

FOREIGN PATENT DOCUMENTS

CN 1233828 A 11/1999
(Continued)

OTHER PUBLICATIONS

Translation of Chinese Office Action dated Nov. 30, 2007 of CN 200610107859.8.

(Continued)

*Primary Examiner* — David D Davis
(74) *Attorney, Agent, or Firm* — Westerman, Hattori, Daniels & Adrian, LLP (57) ABSTRACT

A cone part in a chucking device capable of freely attaching and detaching a disc having a disc shape includes an abutting portion for abutting an inner peripheral surface of a central through hole of the disc with substantially equal forces along an entire circumference thereof and aligning the disc. The cone part is made of a resin material having a high slidability than that of a material used for the disc.

30 Claims, 7 Drawing Sheets

U.S. PATENT DOCUMENTS

| | | |
|---|---|---|
| 2007/0277189 A1 | 11/2007 | Yasumoto et al. |
| 2007/0294712 A1 | 12/2007 | Ito et al. |

FOREIGN PATENT DOCUMENTS

| | | |
|---|---|---|
| CN | 1585013 A | 2/2005 |
| JP | 61-28138 U | 2/1986 |
| JP | 63-65154 U | 4/1988 |
| JP | 63-72750 U | 5/1988 |
| JP | 63-168653 U | 11/1988 |
| JP | 63-195654 U | 12/1988 |
| JP | 2-110050 U | 9/1990 |
| JP | 6-33569 Y2 | 8/1994 |
| JP | 7-18044 Y2 | 4/1995 |
| JP | 07-336929 A | 12/1995 |
| JP | 09-182362 A | 7/1997 |
| JP | 10-134462 A | 5/1998 |
| JP | 11-004568 A | 1/1999 |
| JP | 11-4568 A | 1/1999 |
| JP | 2000-83346 A | 3/2000 |
| JP | 2000-90557 A | 3/2000 |
| JP | 2000-113544 A | 4/2000 |
| JP | 2000-187930 A | 7/2000 |
| JP | 2000-200454 A | 7/2000 |
| JP | 2000-285557 A | 10/2000 |
| JP | 2002-061636 A | 2/2002 |
| JP | 2002-148134 A | 5/2002 |
| JP | 2002-333053 A | 11/2002 |
| JP | 2002-343017 A | 11/2002 |
| JP | 2003-36584 A | 2/2003 |
| JP | 2004-30744 A | 1/2004 |
| JP | 2004-64865 A | 2/2004 |
| JP | 2004-079111 A | 3/2004 |
| JP | 2004-110919 A | 4/2004 |
| JP | 2004-234773 A | 8/2004 |
| JP | 2006-50738 A | 2/2006 |
| JP | 2006-149052 A | 6/2006 |

OTHER PUBLICATIONS

Amendment Under 1.111 filed on Nov. 8, 2010 in U.S. Appl. No. 11/753,981, pp. 1-17 along with 9 sheets of replacement drawings.

Notice of Allowance and Fees Due dated Dec. 14, 2010, issued in U.S. Appl. No. 11/753,981, 14 sheets.

Non-Final Office Action dated Nov. 29, 2010, issued in U.S. Appl. No. 11/765,493, 39 sheets.

* cited by examiner

OPTICAL DISK MOTOR AND DISC DRIVING DEVICE INSTALLING THE OPTICAL DISK MOTOR

BACKGROUND OF THE INVENTION

1. Field of the Invention

The present invention relates to a chucking device for making a disc having a disc shape freely attachable and detachable and a brushless motor and a disc driving device in which the chucking device is installed.

2. Description of the Related Art

In recent years, development of DVD having large capacity as a next-generation DVD (Digital Versatile Disc) for recording a high-quality image demanding a large capacity has been aggressively promoted. In the high-capacity DVD, the high capacity is realized in such a manner that a track pitch is changed from 0.64 μm which was conventionally adopted to 0.32 μm which is a half of the conventional length, and a blue-violet laser having a short wavelength is correspondingly used as a laser for recording and reproduction in place of a red laser having a long wavelength which was conventionally used so that a recording density is increased. Further, the high-capacity DVD is rotated at such a high speed as 10,000 rotations per minute so that a recording speed is increased and a high double speed is realized in the DVD.

In order to retain the recording disc such as the high-capacity DVD, a brushless motor provided with a chucking device for retaining an inner peripheral edge of a central through hole of the recording disc using a plurality of retaining parts having a claw shape or the like and energized by a spring was conventionally adopted.

However, in the chucking device for retaining the recording disc using the plurality of claws, in which only the retaining parts having the claw shape or the like and radially protruded are used to retain the inner peripheral edge of the central through hole of the recoding disc, each retaining part has a different retaining force for retaining the inner peripheral edge of the central through hole of the recording disc. As a result, an aligning accuracy of the recording disc is deteriorated when the recording disc is rotated at such a high speed as 10,000 rotations per minute or in the case where a balancing performance of the recording disc is remarkably inferior. Due to the disadvantage, the high-capacity DVD as the next-generation DVD possibly included the disadvantage that an error occurred in recording and reproduction.

In addition to the foregoing disadvantage, in the chucking device, in the case where the recording disc loses even a slight balance when rotated at such a high speed as 10,000 rotations per minute, the retaining parts and the inner peripheral edge of the central through hole of the recording disc strongly abut each other in one direction by a centrifugal force. This makes positions at which the retaining parts and the recording disc abut each other shifted, which also shifts a position of the recording disc. As a result, a recording/reproducing position changes in an initial stage of the rotation and during the rotation, which possibly caused an error in the recoding and reproduction. The worst possible incident was that the recording disc was possibly disengaged from the chucking device. Further, such a phenomenon that the recording disc and the retaining parts unfavorably bite into each other and move together is generated under the influence of the centrifugal force. When the biting phenomenon is generated, a force which returns a cone part to its original position is enhanced by a reaction generated from the phenomenon, and the recording disc is rapidly returned to its original retaining position at a moment when the force becomes stronger than the force in the meshing direction. As a result, the drastic position shift of the recording disc makes it impossible for a reading function of the recording disc to follow the position shift of the recording disc, which may cause an error in the recording and reproduction. Further, if the retaining force of the recording disc is weak, a vibration is generated between the recoding disc and the chucking device when the recording disc is rotated at a high speed. The vibration makes the recording disc rotate while moving the disc by a minute distance, which also possibly caused an error in the recording and reproduction.

BRIEF SUMMARY OF THE INVENTION

A chucking device according to the present invention is characterized in that a material having a high slidability with respect to a disc constitutes a cone part in contact with the disc.

The cone part is a member which is made to abut an inner peripheral surface of a central through hole of the disc so that the disc is aligned to a central position and retained there. In a conventional chucking device of the same type, a metal member, for example, was used as the material constituting the cone part in order to firmly retain the disc.

In the present invention, the slidability is aggressively imparted between the cone part and the disc. Accordingly, displacement of the disc with respect to the cone part can be prevented particularly when the disc is rotated at a high speed, and the disc can be more smoothly led to the central position of the chucking device when the disc is attached.

A surface roughness Ry of the cone part desirably satisfies approximately 5 μm≦Ry≦approximately 20 μm. Further, it is desirable that the disc be made of polycarbonate, and a coefficient of static friction μ at a part where the cone part and the disc abut each other satisfy approximately 0.15≦μ≦approximately 0.30.

DETAILED DESCRIPTION OF THE INVENTION
OVERALL STRUCTURE OF BRUSHLESS MOTOR

Figure 1:
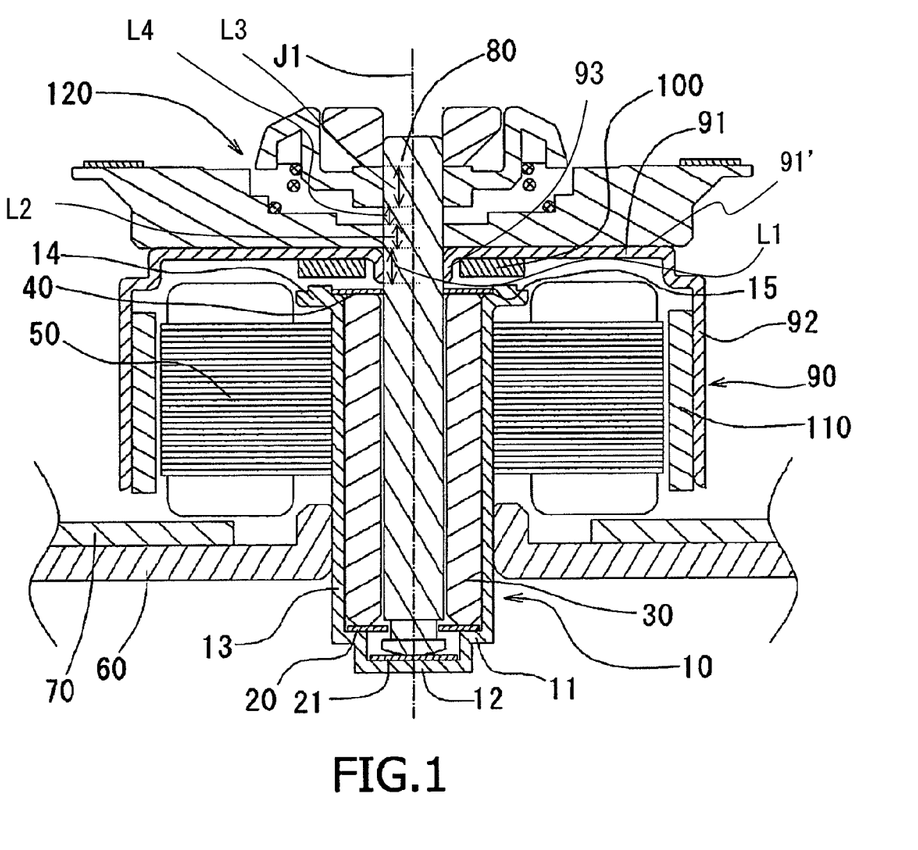
FIG. 1 is a schematic sectional view in an axial direction of a brushless motor according to a preferred embodiment of the present invention.

A brushless motor according to the present invention is described referring to FIG. 1. FIG. 1 is a schematic sectional view illustrating a preferred embodiment of the brushless motor according to the present invention.

First, a fixed member is described.

An annular step part 11 is provided on a lower surface of a sleeve retaining member 10 having a cylindrical shape provided with a bottom and an opening in an upper direction and formed by means of oil-impregnated sintering. An annular washer 20 is provided on an upper surface of the annular step part 11 so as to abut the surface, while a disc washer 21 is provided at the bottom part 12 of the annular step part 11 so as to abut the part.

A cylindrical sleeve 30 is fixedly provided so as to abut an inner peripheral surface of a cylindrical part 13 of the sleeve retaining section 10 and an upper surface of the annular washer 20. The sleeve 30 is made of an oil-impregnated sintered material. An upper end part of the cylindrical part 13 is provided with an extended part 14 extending radially outward, and an inner periphery annular step part 15 is formed on an inner-peripheral side of the extended part 14. A washer 40 is provided in the inner periphery annular step part 15 so as to cover an upper surface of the sleeve 30. The washer 40 is provided in order to lead oil oozed from the sleeve 30 back to the sleeve 30 again.

An armature 50 formed in an annular shape is secured to an outer peripheral surface of the cylindrical part 13 of the sleeve retaining section 10. On a lower side of the armature 50, a mounting plate 60 for securing the brushless motor to the other components is secured to the outer peripheral surface of the cylindrical part 13. A circuit substrate 70 for controlling rotation of the brushless motor is secured to an upper surface of the mounting plate 60.

Next, a rotational member is described.

A shaft 80 is insertably provided on an inner peripheral surface of the sleeve 30, and the sleeve 30 rotatably supports the shaft 80. To an upper part of the shaft 80 are secured a cylindrical rotor holder 90 having a cap and an opening in a lower direction so as to externally surround the sleeve retaining section 10, sleeve 30 and armature 50. A preload magnet 100 having an annular shape is secured to a surface of a cap part 91 of the rotor holder 90 axially facing the extended part 14 of the sleeve retaining section 10. Further, a rotor magnet 110 having an annular shape is secured to an inner peripheral surface of a cylindrical part 92 of the rotor holder 90. An inner peripheral surface of the rotor magnet 110 and an outer peripheral surface of the armature 50 face each other with a radial interval therebetween.

A chucking device 120 for aligning and retaining a disc having a disc shape (not shown) is secured to an upper surface of the cap part 91 of the rotor holder 90.

When a current is supplied to the armature 50 from outside, the armature 50 generates a magnetic field, and the rotational member, which obtains a driving force through an interaction between the magnetic field and the rotor magnet 110, is rotated.

Structure of Chucking Device

Figure 2:
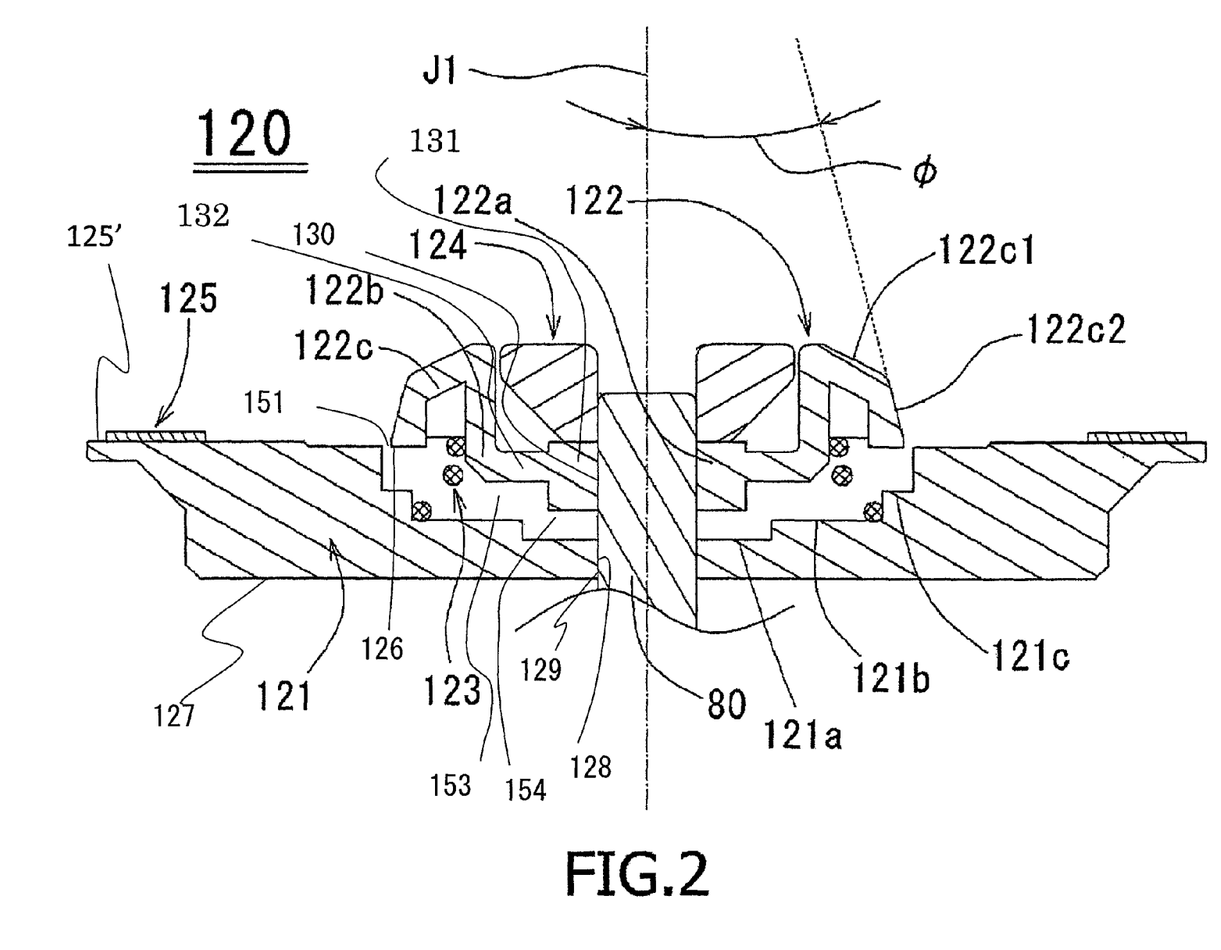
FIG. 2 is an enlarged view of a chucking device shown in FIG. 1.
Figure 3:
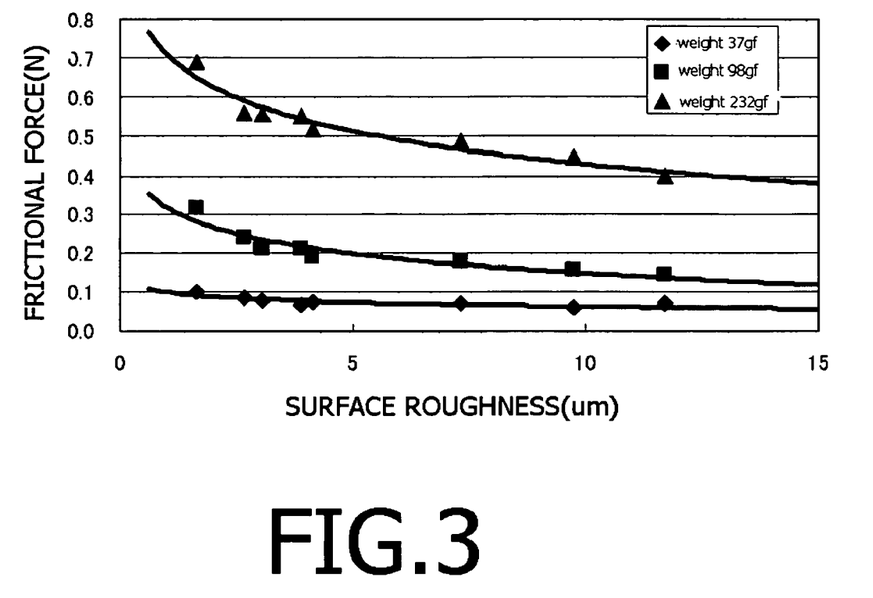
FIG. 3 is a graph showing a result of a test for measuring a frictional force when a surface roughness is increased.
Figure 4:
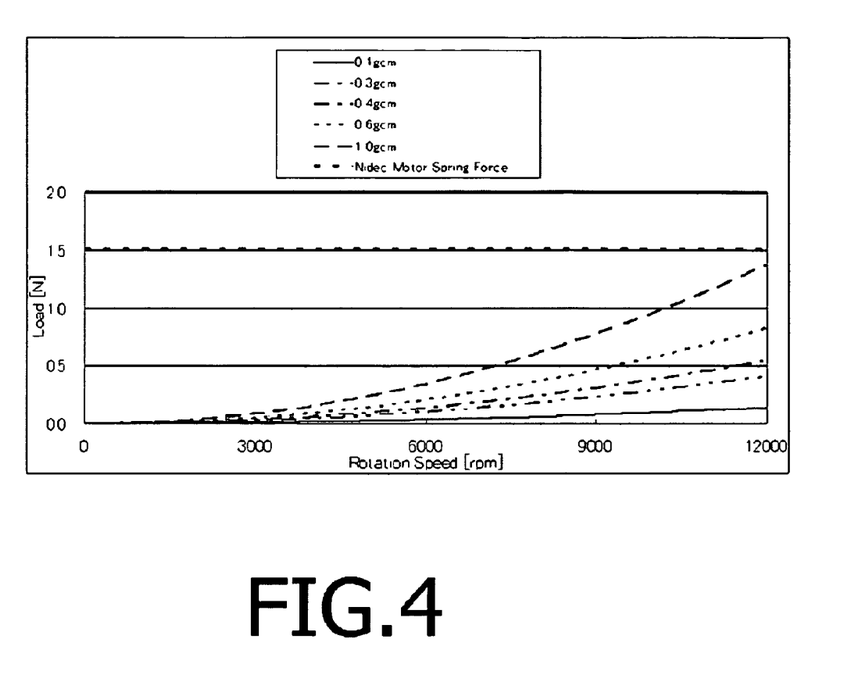
FIG. 4 is a graph showing a result of measurement of a spring force necessary for preventing occurrence of an error in the disc at respective numbers of rotations.

A structure of the chucking device 120, which is a main component of the present invention, is described referring to FIG. 2. FIG. 2 is an enlarged view of the chucking device 120 shown in FIG. 1. A dotted and dashed line shown in FIG. 2 denotes a central axis which is a rotational axis. FIG. 3 is a graph showing a frictional coefficient with respect to a surface roughness measured according to a frictional coefficient measuring method defined by the Japanese Industrial Standards. FIG. 4 is a graph showing a spring force necessary for number of rotations per unbalancing load of the disc.

Referring to FIG. 2, the chucking device 120 includes a turn table 121 on which the disc is placed, a cone part 122 for retaining the disc, a spring 123 for axially energizing the cone part 122, and a yoke section 124 which is a movement regulator for regulating an axial movement of the cone part 122.

The disc is placed on the turn table 121 while an inner peripheral edge of a central through hole thereof is retained by the cone part 122. An upper surface of the disc is controlled by a clamp (not shown) so that the disc is further retained.

1) Turn Table

The turn table 121 secured to the upper surface of the cap part 91 of the rotor holder 90 has a central through hole and is position-secured to be concentric to the rotational axis when pressed into the shaft 80. Three recessed portions respectively deepened from the outer side toward the center and having different diameters are formed at a central part of the turn table 121, and they are respectively referred to, from the inner side, as a first recessed portion 121a, a second recessed portion 121b and a third recessed portion 121c. These recessed portions serve to house the cone part 122 without applying any restriction to the movement of the cone part 122 when the cone part 122 moves downward. Further, an annular disc rubber 125 made of an elastic material such as rubber, which serves as a surface on which the disc is placed, is secured an outer-peripheral side upper surface of the turn table 121.

2) Cone Part

The cone part 122 provided on an upper side in comparison to the three recessed portions of the turn table 121 comprises a sliding part 122a having a central through hole and a sliding surface on an inner periphery thereof, a coupling part 122b extending radially outward and axially upward, and a retaining part 122c for retaining the disc.

Through hole of the sliding part 122a is inserted into an outer peripheral surface of the shaft 80 to be concentric to the central axis. The sliding surface, which is the inner peripheral surface of the through hole and slides with the shaft 80, faces the outer peripheral surface of the shaft 80 with a very small radial interval therebetween. In the case where a sliding agent is filled into the very small interval, the cone part 122 can more smoothly axially move. Thereby, the disc can be smoothly attached and detached.

An upper surface of the retaining part 122c is a tilting surface tilting downward toward the outer side includes a guiding part 122c1 for guiding the disc in an aligning manner and an abutting portion 122c2 for abutting and retaining the disc, which is a tilting surface provided more radially outward than the guiding part 122c1 and tilting through an angle changed further downward.

The cone part 122 is made of a resin material. A coefficient of static frictional between an outer peripheral surface of the abutting portion 122c2 of the retaining part 122c and the inner peripheral surface of the central through hole of the disc is smaller than a coefficient of static frictional between the outer peripheral surface of the abutting portion 122c2 and the central through hole of the disc in the case where the cone part 122 is made of a metal material.

An angle $\phi$ formed by the tilting surface of the abutting portion 122c2 and the central axis as the rotational axis is desirably at least 12 degrees and at most 15 degrees (preferably 13.5 degrees). In the case where the angle range is set, an influence generated by a centrifugal force acting on the abutting portion 122c2 when the disc is rotated at a high speed can be reduced. In particular, a component of force acting on the abutting portion 122c2 axially downward due to the centrifugal force can be reduced. The downward movement of the cone part 122 can be thereby controlled, which consequently controls the displacement of the disc. The angle $\phi$ is preferably as close to 0 degree as possible so that the force participating in the centrifugal-force direction can be controlled by the tilt. However, the angle desirably stays in the foregoing range in order to retain the discs of any type because a diameter of the central through hole of the disc is variable to a certain extent depending on the type of the disc. When the angle is at most the foregoing degree, the disc and the cone part may unfavorably bite into each other, resulting in the position-shift of the disc. Further, the disc having the central through hole whose diameter is large cannot obtain a necessary retaining force. When the angle is at least the degree, the positions of the disc and the cone part 122 shift relative to each other under the influence of the centrifugal force because the disc loses its balance. More specifically, the force acts on the a butting portion 122c2 due to the influence of the centrifugal force, which moves the cone part 122 downward, and the disc, thereby moves to the upper side of the cone part 122, may be disengaged from the chucking device 120.

A surface roughness Ry of the tilting surface of the abutting portion 122c2 is in the rage of Ry=5 μm-20 μm (preferably, Ry=10 μm-15 μm). The surface roughness Ry is a value obtained in such a manner that a reference length is retrieved from a roughness curve in a direction of an average line, and a distance between a top line and a bottom line of the retrieved part is measured in a direction of a longitudinal magnification of the roughness curve.

Referring to FIG. 3, a relationship between the surface roughness and the frictional force is described. FIG. 3 is a graph showing a result obtained in such a manner that the disc is placed on resin, a bell having a predetermined weight (which is shown by load in the drawing) is placed thereon, and a load at a moment when the bell is horizontally pulled and starts to move is measured as the frictional force.

It is known from the graph of FIG. 3 that the frictional force is reduced as the surface roughness is increased. Referring to the load of each bell, the frictional force is high when the surface roughness is at most 5 μm, while the frictional force is drastically reduced as the surface roughness is increased in the graph. However, the frictional force is gradually reduced as the surface roughness is increased when the surface roughness is at least 5 μm. Therefore, when the surface roughness is set to at least 5 μm, a low frictional force can be stably obtained. As a result, the frictional coefficient between the abutting portion 122c2 and the recording disc can be reduced, and a vibration between the disc and the cone part 122 can be controlled. The axial and radial displacements of the disc, which result from the action of the downward force on the disc and the abutting portion 122c2 generated in consequence of the disc and the abutting portion 122c2 of the cone part 122 biting into each other due to the vibration, can be prevented. Then, the disc can be prevented from rapidly returning to its original position due to the displacements. Therefore, occurrence of an error in the recording and reproduction when the disc is rotated at a high speed can be prevented.

When the surface roughness is larger than 20 μm, the inner peripheral edge of the central through hole of the disc and the abutting portion 122c2 of the cone part 122 scrape each other when the disc is attached and detached, which wears the contact surfaces thereof when the disc is attached and detached. As a result, the position of the disc may axially shift when a large number of discs are repeatedly attached and detached.

Therefore, the surface roughness Ry of the tilting surface of the abutting portion 122c2 is desirably in the range of Ry=5 μm-20 μm (preferably, Ry=10 μm-15 μm) so that the abutting portion can stably abut the disc with a small frictional force and the wear of the abutting portion 122c2 and the central through hole of the disc can be prevented. Furthermore an axial surface roughness Rya of the abutting portion in the cone part satisfies the relationship of approximately 5 μm≦Ry≦20 μm. Here, the Rya is measured along the axial direction of the tilting surface of the abutting portion 122c2.

The surface roughness of the tilting surface of the abutting portion 122c2 is desirably formed when a molding die is formed. In particular, a surface roughness of the molding die at a position where the abutting portion 122c2 is formed is roughened so that the surface roughness of the tilting surface of the abutting portion 122c2 can be formed at the same time as the formation of the molding die. Thereby, a step of adjusting the surface roughness in the range of Ry=5 μm-20 μm, which is to be implemented after the molding die is formed, can be omitted, which controls a processing cost of the cone part 122.

3) Spring

A spring 123 provided on an upper surface of the second recessed portion 121b of the tune table section 121 and abutting a lower side of the retaining part 122c of the cone part 122 to thereby support the cone part 122. The spring 123 is made of a material having a superior elasticity such as a coil spring or an elastic resin spring. In the present preferred embodiment, the coil spring is adopted.

FIG. 4 is a graph showing a spring force which makes the disc disengaged from the chucking device 120 during the rotation at respective numbers of rotations.

Referring to FIG. 4, the spring force of the spring 123 is desirably in the range of at least 1.2 N and at most 2.0 N (preferably, 1.5N). Because the device was conventionally used for a low-speed rotation, the influence of the centrifugal force of the disc was small, and the spring force was correspondingly small. However, in the disc demanding such a high-speed rotation as 10,000 rotations per minute such as the high-capacity DVD, the disc strongly abuts the abutting portion 122c2 of the cone part 122, and the component of force resulting from the centrifugal force caused by the unbalanced disc is exerted axially downward. The conventional spring force was at most 1.2 N, which was small, a reaction against the component of force exerted axially downward, which results from the centrifugal force, was weak, which made it easy for the cone part 122 to move downward, and the disc quite possibly jumped out of the cone part 122. The disc can be thus easily removed from the cone part 122 when the spring force is smaller than 1.2 N. Therefore, it is necessary to set the spring force to a large value in order to counteract the component of force exerted axially downward resulting from the centrifugal force. However, when the spring force is larger than 2.0 N, on the contrary, the abutting force between the abutting portion 122c2 of the cone part 122 and the disc is too large, which makes it difficult to attach the disc to the chucking device 120. Therefore, the spring force is set to at least 1.2 N and at most 2.0 N referring to the graph (preferably, 1.5 N) so that the downward movement of the abutting portion 122c2 due to the centrifugal force of the disc can be prevented. As a result, the motor capable of preventing the displacement and disengagement of the disc and having a high reliability can be provided.

4) Yoke Section

The yoke section 124 formed by the magnetic member placed on the upper part of the cone part 122 is pressed into the shaft 80 and secured thereto to thereby restrict the axially upward movement of the cone part 122. A magnetic attraction force between the magnet installed on the clamp side and the yoke section serves as one of factors for retaining the disc as a clamp force.

5) Coefficient of Static Friction

The coefficient of static friction between the inner peripheral edge of the central through hole of the disc and the abutting portion 122c2 of the cone part 122, which are made of polycarbonate, is set to at least 0.15 and at most 0.30 (preferably, around 0.20). When the coefficient of static friction is set to at least 0.15, the frictional force of a certain level can be secured between the disc and the cone part 122. Then, the disc can be prevented from sliding relatively axially upward even though the disc strongly abuts the cone part 122 in one direction due to the influence of the centrifugal force thereof and the cone part 122 thereby moves axially downward. As a result, the disc can be prevented from popping out of the chucking device 120. Further, when the coefficient of static friction is set to at most 0.30, the disc and the cone part 122 can be prevented from biting into each other, which is caused by the centrifugal force of the disc. As a result, the sudden position shift of the disc can be controlled so that occurrence of an error in the recording and reproduction when the disc is rotated at a high speed can be prevented.

6) Material for Cone Part

Figure 5:
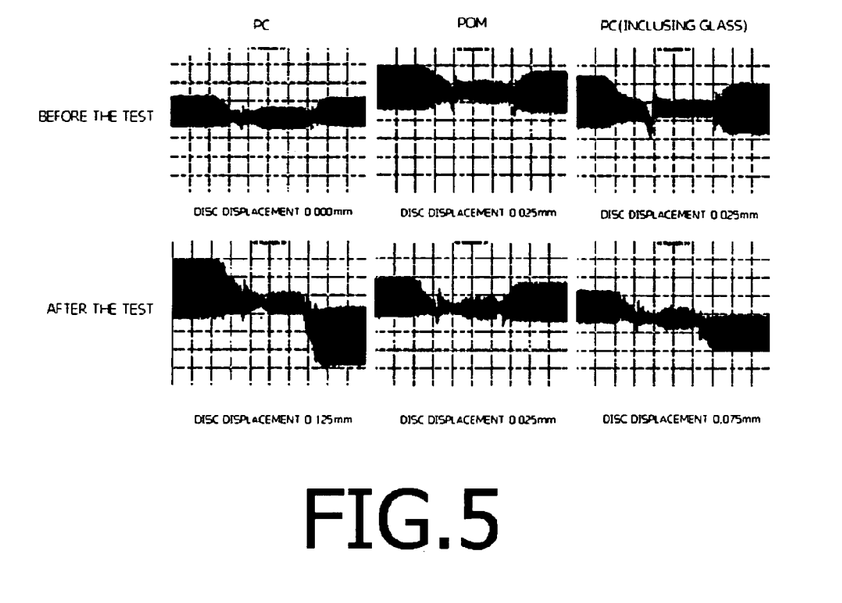
FIG. 5 shows a test result in which the disc was repeatedly attached and detached depending on materials used for the cone part.

Referring to FIG. 5, a material for the cone part 122 is described. FIG. 5 shows a result of the disc displacement before and after a test in which the disc was attached and detached 30,000 times at normal temperature. FIG. 5 further shows comparison of the cone part 122 made of polycarbonate (hereinafter, referred to as PC), polycarbonate including glass (hereinafter, referred to as PC (including glass) and polyacetal resin (hereinafter, referred to as POM).

Referring to FIG. 5, the disc displacements in the case of all of the materials used before the test were: 0 mm for PC; 0.025 mm for POM; and 0.025 mm for PC (including glass), which showed a very little difference in the respective materials. However, after the test, the disc displacements in the case of PC and PC (including glass) were respectively 0.125 μm and 0.075 μm, which showed large increases. In comparison to these materials, the disc displacement was 0.025 before and after the test in the case of POM, and it is known from the result that there was no difference before and after the test. The frictional coefficient was low in the case of POM in comparison to PC and PC (including glass), which reduces the abutting force with respect to the disc. As a result, the disc and the cone part 122 can be prevented from biting into each other. Therefore, the disc displacement before and after the test, which is shown in the result of FIG. 5, can be controlled. Based on the foregoing outcome, POM is preferably used as the material for the cone part 122.

7) Relationship Between Laminated Disc and Cone Part

Figure 6:
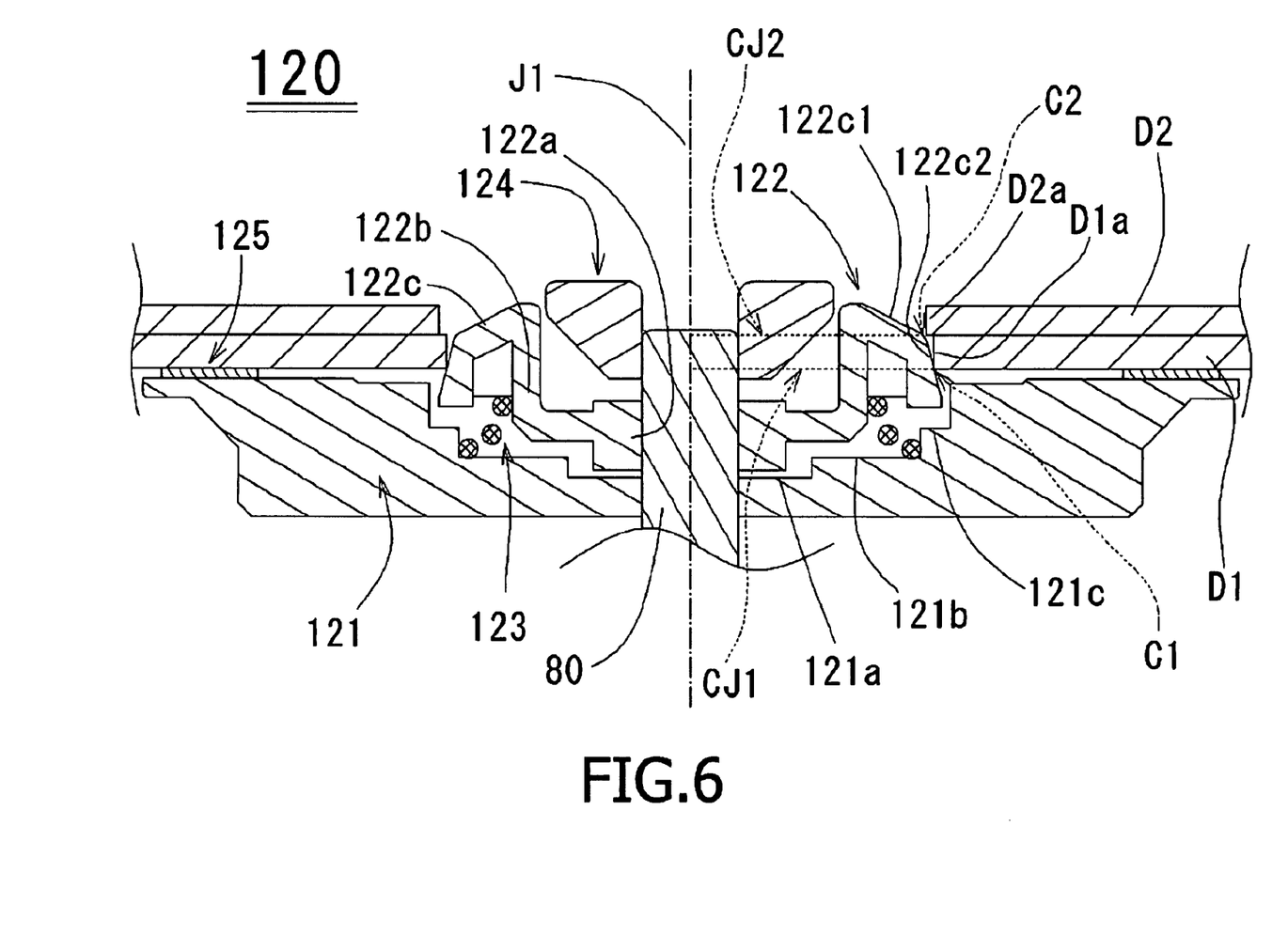
FIG. 6 Shows a schematic sectional view in the axial direction, which shows a state where the laminated disc D is placed in FIG. 2.

Referring to FIG. 6, a positional relationship between a laminated disc D placed on the upper surface of the rubber 125 as the placement surface and the cone part 122 is described. FIG. 6 is a schematic sectional view in the axial direction, which shows a state where the laminated disc D is placed in FIG. 2.

The laminated disc D includes a lower-side disc substrate D1 on the rubber-125 side and an upper-side disc substrate D2 laminated on an upper surface of the lower-side disc substrate D1. Central through holes D1$a$ and D2$a$ are formed in the lower-side disc substrate D1 and the upper-side disc substrate D2.

A curved surface part 122$c$3 protruded radially outward is formed in a part where the abutting portion 122$c$2 and the guiding part 122$c$1 are coupled with each other in the cone part 122. In the presence of the curved surface part 122$c$3, the lower-side disc substrate D1 of the laminated disc D can be favorably guided from the guiding part 122$c$1 to the abutting portion 122$c$2.

A border part BL between the lower-side disc substrate D1 and the upper-side disc substrate D2 radially overlaps with the curved surface part 122$c$3. Therefore, the upper-side disc substrate D2 radially overlaps with the guiding part 122$c$1 and is provided radially in vicinity of the guiding part 122$c$1. More specifically, a dimension of a radius from a point C1 at which a virtual plane including the upper surface of the rubber 125 as the placement surface and the abutting portion 122$c$2 intersect with each other to a nodal line CJ1 at which a straight line vertical to a rotational axis J1 and the rotational axis J1 intersect with each other is arranged to be substantially equal to or smaller than a radius of the central through hole D1$a$ of the lower-side disc substrate D1. By a thickness of the lower-side disc substrate D1, a dimension of a radius from a point C2 at which the boundary part BL which is a second virtual plane distant from the nodal line CJ1 axially upward and a local surface part 122$c$3 which is the outer peripheral surface of the cone part 122 intersect each other to a nodal line CJ2 at which a straight line vertical to the rotational axis J1 and the rotational axis J1 is arranged to be smaller than a radius of the central through hole D2$a$ of the upper-side disc D2 by an amount equal to or larger than a maximum shift amount at a radial position which the upper-side disc substrate D2$a$ is allowed to have relative to the lower-side disc substrate D1. Therefore, the upper-side disc substrate D2 makes no contact with the abutting portion 122$c$2, and the lower-side disc substrate D1 can be used as the basis of the alignment. Thereby, reduction of an aligning accuracy, which occurs when the lower-side disc substrate D1 and the upper-side disc substrate D2 contact with each other, can be controlled.

The lower-side disc substrate D1 alone is used for the alignment, while the upper-side disc substrate D2 is prevented from making the contact by the guiding part 122$c$1. Therefore, the angle φ formed by the abutting surface 122$c$2 and the rotational axis J1 can be set without any regard to a possible shift when the upper-side disc substrate D2 is laminated.

8) Disc Driving Device

Figure 7:
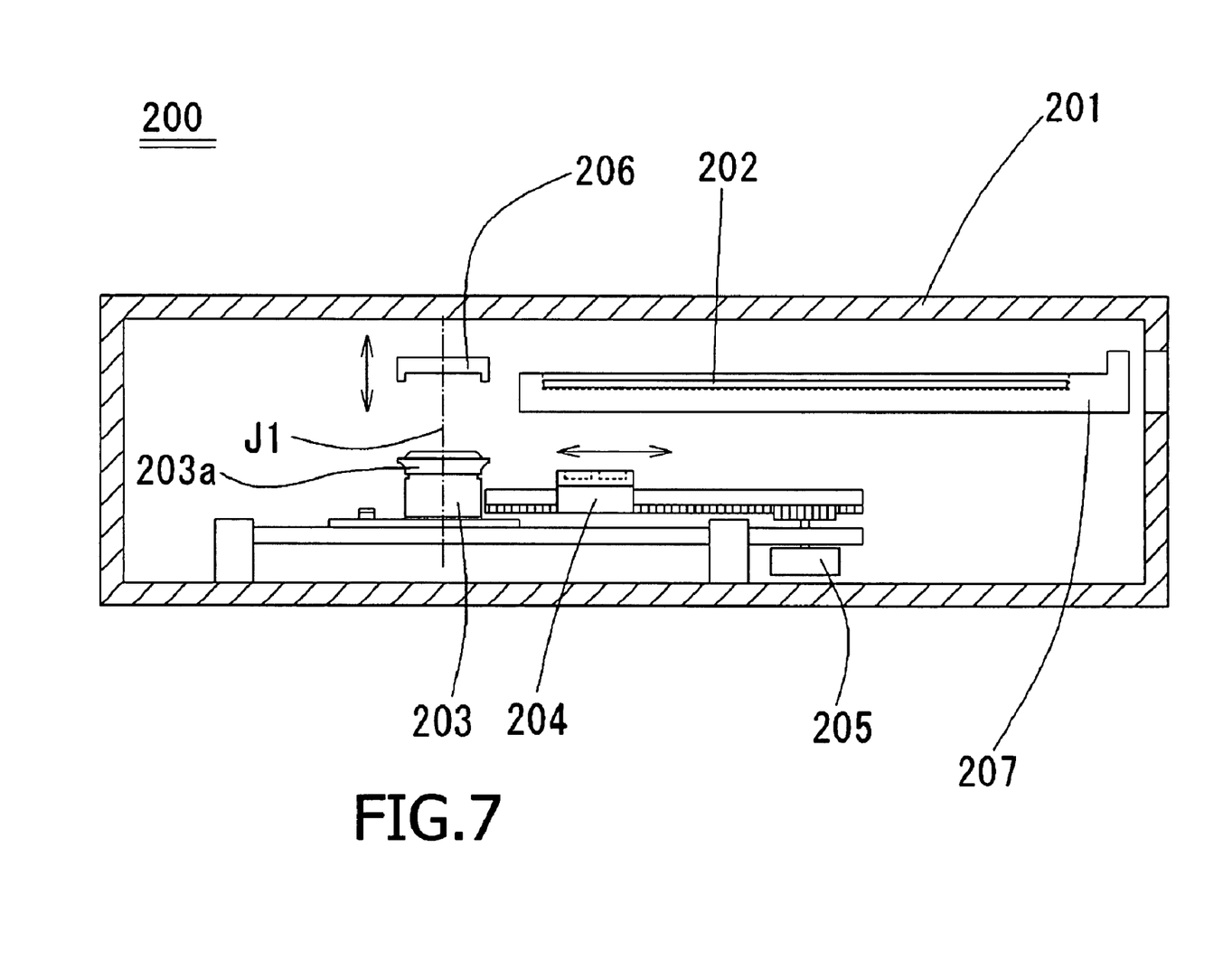
FIG. 7 shows a state where a laminated disc is attached to the chucking device shown in FIG. 2.

Referring to FIG. 7, a preferred embodiment of the disc driving device according to the present invention is described. FIG. 7 is a schematic sectional view in the axial direction illustrating the preferred embodiment of the disc driving device.

Referring to FIG. 7, a disc driving device 200 includes a housing cabinet 201, a brushless motor 203 which is placed in the housing cabinet 201 and rotates a detachable disc 202 in a predetermined direction, an optical pickup mechanism 204 for recording and reproducing information at a required position of the disc 202, an optical pickup movement mechanism 205 capable of moving the optical pickup mechanism 204 in a predetermined direction vertical to the rotational axis J1 of the brushless motor 203, a clamp member 206 for pressing the disc 202 from the axially upper direction and retaining it, and a tray 207 for inserting and discharging the disc 202.

The optical pickup mechanism 204 is a mechanism for recording and reproducing the information with respect to the disc 202 using a laser light, and mainly includes a light source, an optical system for introducing the laser light from the light source to the disc 202, and a light-receiving element for receiving a reflected light from the disc 202, and the like.

The optical pickup movement mechanism 205 includes a gear train for coupling the optical pickup mechanism 204 and the optical pickup movement mechanism 205, and a motor for driving the gear train.

The clamp member 206 is provided at a substantially same position as that of the rotational axis J1 and axially movable. In a state where the disc 202 is placed in the chucking device 203$a$ of the brushless motor 203 and aligned, the clam member 206 moves axially downward, and presses the disc 202 from the axially upward direction to thereby retain the disc 202.

The preferred embodiment of the present invention was so far described, however, the present invention is not limited thereto and can be variously modified within the scope of its right.

For example, in the preferred embodiments, the sleeve 30 supports the shaft 80, however, the present invention is not limited thereto. A ball bearing may alternatively support the shaft 80.

Further, in the preferred embodiments, POM is used as the material for the cone part 122, however, the present invention is not limited thereto. A material having a high slidability, such as PEEK (polyetherkelton etherketone), PPS (polyphenylene sulfide), TPE (thermoplastic elastomer) or nylon-based material, may be used as the material.

What is claimed is:

1. An optical disk motor for rotating a disc having a central through hole, comprising:
    a shaft of a first single piece member having a rotational axis;
    a rotor holder of a second single piece member comprising an inner part extending axially downward to secure the shaft; a cap part having an upper surface; and a cylindrical part securing a rotor magnet, wherein there is a first vertical length from a lower end of the inner part to the upper surface;
    a third single piece member provided to be concentric to the rotational axis, the third single piece member having a placement face above which the disc is placed; a through hole having an innermost inner surface having a second vertical length; and a lower surface secured to an upper surface of the rotor holder;
    a cone part positioned on an upper-surface side of the third single piece member, the cone part comprising:
        an abutting portion having a tilting surface a diameter of which increases along axially downward direction and retains an inner peripheral surface of the central through hole of the disc with pressure approximately uniform in a circumferential direction;
        a guiding portion which is a portion of the cone part, the upper-surface having a shape of a side face of a truncated cone with a diameter of which increases along axially downward direction, a radially outer edge of the upper-surface connected to the abutting portion at the upper-edge thereof from an axially upper direction;
        a sliding surface for sliding the cone part on the shaft, the sliding surface having a third vertical length; and
        an end part provided on an upper-surface side of the cone part, inhibiting the movement toward the upper direction beyond a predetermined position;
    and
    a spring provided between the third single piece member and the cone part, the spring applying pressure to the cone part toward axially upward direction;
    wherein at least a surface of the abutting portion of the cone part is made of a resin material which shows a smaller frictional coefficient against the inner peripheral surface of the central through hole of the disc than a frictional coefficient of a metal material thereagainst,
    wherein there is a gap between the cone part and the third single piece member when the cone part takes its uppermost position,
    wherein the third vertical length is longer than the second vertical length;
    wherein there is a fourth vertical length between the slidable surface and the innermost inner surface when the cone part takes its uppermost position, the fourth vertical length being shorter than the first vertical length,
    wherein the first vertical length, the second vertical length, the third vertical length and the fourth vertical length are along with the shaft.

2. The optical disk motor as claimed in claim 1, wherein the cone part is made of polyacetal or acetal resin.

3. The optical disk motor as claimed in claim 1, wherein an angle φ formed by the tilting surface of the abutting portion in the cone part and the rotational axis satisfies the relationship of approximately 12 degrees $\leq \phi \leq$ approximately 15 degrees.

4. The optical disk motor as claimed in claim 3, wherein a spring force F of the spring satisfies the relationship of approximately 1.2N $\leq F \leq$ approximately 2.0N.

5. The optical disk motor as claimed in claim 1, wherein a surface roughness Ry of the cone part satisfies the relationship of approximately 5 μm $\leq Ry \leq$ approximately 20 μm.

6. The optical disk motor as claimed in claim 1, wherein an axial surface roughness Rya of the abutting portion in the cone part satisfies the relationship of approximately 5 μm $\leq Rya \leq$ approximately 20 μm.

7. The optical disk motor as claimed in claim 1, wherein the disc is made of polycarbonate, and
    a coefficient of static friction μ between the central through hole of the disc and the abutting portion of the cone part satisfies the relationship of approximately $0.15 \leq \mu \leq$ approximately 0.30.

8. A optical disk motor as claimed in claim 1, wherein the rotor holder comprises the cylindrical part and the cap part extending between the shaft and the cylindrical part, the cap part having the upper surface to which a chucking device including the cone part and the spring for holding the disk is secured, a rotational member including the rotor holder and rotating around the rotational axis;
    a fixed member having a bearing part for rotatably supporting the rotational member; and
    an armature facing the rotor magnet, the armature generating a driving force in a direction of the rotation around the rotational axis.

9. A disc driving device, comprising:
    the optical disk motor as claimed in claim 8;
    a pickup mechanism for recording and reproduction information with respect to the disc;
    a clamp member for retaining the disc by sandwiching the disc between itself and the placement face;
    a disc movement mechanism for moving the disc to the placement surface; and
    a housing cabinet for housing the pickup mechanism, the clamp member and the disc movement mechanism.

10. The optical disk motor as claimed in claim 1, wherein the third single piece member is provided with an annular disc member on the placement face, the disc being placed on the annular disc member.

11. The optical disk motor as claimed in claim 10, wherein the annular disc member is made of a rubber.

12. The optical disk motor as claimed in claim 1, wherein the innermost inner surface contacts the shaft.

13. The optical disk motor as claimed in claim 1, wherein the cone part is made of a fourth single piece member.

14. The optical disk motor as claimed in claim 1, wherein the third single piece member serves as a turn table.

15. The optical disk motor as claimed in claim 1, wherein the cone part further comprising:
    a horizontal extension portion provided between the sliding surface and the guiding part, wherein an upper end of the sliding surface is located above the horizontal extension portion.

16. The optical disk motor as claimed in claim 1, wherein the cone part further comprising:
    a sliding portion having the sliding surface; and
    a horizontal extension portion provided between the sliding surface and the guiding part, wherein an upper end of the sliding surface is located above the horizontal extension portion, wherein an upper surface of the sliding portion abuts a yoke section when the cone part takes its uppermost position.

17. An optical disk motor for rotating a disc having a central through hole, comprising:
  a shaft of a first single piece member having a rotational axis;
  a rotor holder of a second single piece member comprising an inner part extending axially downward to secure the shaft; a cap part having an upper surface; and a cylindrical part securing a rotor magnet, wherein there is a first vertical length from a lower end of the inner part to the upper surface;
  a third single piece member provided to be concentric to the rotational axis, the third single piece member having a placement face above which the disc is placed; a through hole having an innermost inner surface having a second vertical length; and a lower surface secured to an upper surface of the rotor holder;
  a cone part positioned on an upper-surface side of the third single piece member, the cone part comprising:
    an abutting portion having a tilting surface a diameter of which increases along axially downward direction and retains an inner peripheral surface of the central through hole of the disc with pressure approximately uniform in a circumferential direction;
    a guiding portion which is a portion of the cone part, the upper-surface having a shape of a side face of a truncated cone with a diameter of which increases along axially downward direction, a radially outer edge of the upper-surface connected to the abutting portion at the upper-edge thereof from an axially upper direction;
    a sliding surface for sliding the cone part on the shaft, the sliding surface having a third vertical length; and
    an end part provided on an upper-surface side of the cone part, inhibiting the movement toward the upper direction beyond a predetermined position; and
  a spring provided between the third single piece member and the cone part, the spring applying pressure to the cone part toward axially upward direction;
  wherein a surface roughness Ry of the cone part satisfies the relationship of approximately $5\,\mu m \leq Ry \leq$ approximately $20\,\mu m$,
  wherein there is a gap between the cone part and the third single piece member when the cone part takes its uppermost position,
  wherein the third vertical length is longer than the second vertical length;
  wherein there is a fourth vertical length between the slidable surface and the innermost inner surface when the cone part takes its uppermost position, the fourth vertical length being shorter than the first vertical length,
  wherein the first vertical length, the second vertical length, the third vertical length and the fourth vertical length are along with the shaft.

18. The optical disk motor as claimed in claim 17, wherein an axial surface roughness Rya of the abutting portion in the cone part, the Rya being measured along the axial direction, satisfies the relationship of approximately $5\,\mu m \leq Ry \leq 20\,\mu m$.

19. The optical disk motor as claimed in claim 17, wherein the disc is made of polycarbonate, and
  a coefficient of static friction $\mu$ between the inner surface of the central through hole of the disc and that of the abutting portion of the cone part satisfies the relationship of approximately $0.15 \leq \mu \leq$ approximately $0.30$.

20. A optical disk motor as claimed in claim 17, wherein the rotor holder comprises the cylindrical part and the cap part extending between the shaft and the cylindrical part, the cap part having the upper surface to which a chucking device including the cone part and the spring for holding the disk is secured, a rotational member including the rotor holder and rotating around the rotational axis;
  a fixed member having a bearing part for rotatably supporting the rotational member; and
  an armature facing the rotor magnet, the armature generating a driving force in a direction of the rotation around the rotational axis.

21. A disc driving device, comprising:
  the optical disk motor as claimed in claim 20;
  a pickup mechanism for recording and reproducing information with respect to the disc;
  a clamp member for retaining the disc by sandwiching the disc between itself and the placement face;
  a disc movement mechanism for moving the disc to the placement face; and
  a housing cabinet for housing the pickup mechanism, the clamp member and the disc movement mechanism.

22. An optical disk motor for rotating a disc having a central through hole, comprising:
  a shaft of a first single piece member having a rotational axis;
  a rotor holder of a second single piece member comprising an inner part extending axially downward to secure the shaft; a cap part having an upper surface; and a cylindrical part securing a rotor magnet, wherein there is a first vertical length from a lower end of the inner part to the upper surface;
  a third single piece member provided to be concentric to the rotational axis, the third single piece member having a placement face above which the disc is placed; a through hole having an innermost inner surface having a second vertical length; and a lower surface secured to an upper surface of the rotor holder;
  a cone part positioned on an upper-surface side of the third single piece member, the cone part comprising:
    an abutting portion having a tilting surface a diameter of which increases along axially downward direction and retains an inner peripheral surface of the central through hole of the disc with pressure approximately uniform in a circumferential direction;
    a guiding portion which is a portion of the cone part, the upper-surface having a shape of a side face of a truncated cone with a diameter of which increases along axially downward direction, a radially outer edge of the upper-surface connected to the abutting portion at the upper-edge thereof from an axially upper direction;
    a sliding surface for sliding the cone part on the shaft, the sliding surface having a third vertical length; and
    an end part provided on an upper-surface side of the cone part, inhibiting the movement toward the upper direction beyond a predetermined position; and
  a spring provided between the third single piece member and the cone part, the spring applying pressure to the cone part toward axially upward direction;
  wherein the disc is made of polycarbonate, and a coefficient of static friction $\mu$ between the surface of the central through hole of the disc and that of the abutting portion of the cone part satisfies the relationship of approximately $0.15 \leq \mu \leq$ approximately $0.30$ wherein there is a gap between the cone part and the third single piece member when the cone part takes its uppermost position,
wherein the third vertical length is longer than the second vertical length;
wherein there is a fourth vertical length between the slidable surface and the innermost inner surface when the cone part takes its uppermost position, the fourth vertical length being shorter than the first vertical length,
wherein the first vertical length, the second vertical length, the third vertical length and the fourth vertical length are along with the shaft.

23. An optical disk motor as claimed in claim 22, wherein the rotor holder comprises the cylindrical part and the cap part extending between the shaft and the cylindrical part, the cap part having the upper surface to which a chucking device including the cone part and the spring for holding the disk is secured, a rotational member including the rotor holder and rotating around the rotational axis;
   a fixed member having a bearing part for rotatably supporting the rotational member; and
   an armature facing the rotor magnet, the armature generating a driving force in a direction of the rotation around the rotational axis.

24. A disc driving device, comprising:
   the optical disk motor as claimed in claim 23;
   a pickup mechanism for recording and reproduction information with respect to the disc;
   a clamp member for retaining the disc by sandwiching the disc between itself and the placement face;
   a disc movement mechanism for moving the disc to the placement surface; and
   a housing cabinet for housing the pickup mechanism, the clamp member and the disc movement mechanism.

25. An optical disk motor for rotating a disc having a central through hole, comprising:
   a shaft of a first single piece member having a rotational axis;
   a rotor holder of a second single piece member comprising an inner part extending axially downward to secure the shaft; a cap part having an upper surface; and a cylindrical part securing a rotor magnet, wherein there is a first vertical length from a lower end of the inner part to the upper surface;
   a third single piece member provided to be concentric to the rotational axis, the third single piece member having a placement face above which the disc is placed; a through hole having an innermost inner surface having a second vertical length; and a lower surface secured to an upper surface of the rotor holder;
   a cone part positioned on an upper-surface side of the third single piece member, the cone part comprising:
      an abutting portion having a tilting surface a diameter of which increases along axially downward direction and retains an inner peripheral surface of the central through hole of the disc with pressure approximately uniform in a circumferential direction;
      a guiding portion which is a portion of the cone part, the upper-surface having a shape of a side face of a truncated cone with a diameter of which increases along axially downward direction, a radially outer edge of the upper-surface connected to the abutting portion at the upper-edge thereof from an axially upper direction;
      a sliding surface for sliding the cone part on the shaft, the sliding surface having a third vertical length; and
      an end part provided on an upper-surface side of the cone part, inhibiting the movement toward the upper direction beyond a predetermined position; and
   a spring provided between the third single piece member and the cone part, the spring applying pressure to the cone part toward axially upward direction,
   wherein the abutting portion of the cone part contacts only the axially lowest layer of the laminated disc shaped layers;
   wherein there is a gap between the cone part and the third single piece member when the cone part takes its uppermost position,
   wherein the third vertical length is longer than the second vertical length;
   wherein there is a fourth vertical length between the slidable surface and the innermost inner surface when the cone part takes its uppermost position, the fourth vertical length being shorter than the first vertical length,
   wherein the first vertical length, the second vertical length, the third vertical length and the fourth vertical length are along with the shaft.

26. The optical disk motor as claimed in claim 25, wherein a radius of a first imaginary circle surrounding the rotational axis, formed by intersecting the tilting surface and a first imaginary plane which includes the placement face, is approximately equal to or smaller than a radius of the through hole of the axially lowest layer of the laminated disc shaped layers; and
   wherein a radius of a second imaginary circle formed by intersecting a peripheral surface of the cone part and a second imaginary plane which is a plane parallel to the first imaginary plane and separated upward from the first imaginary plane by a distance of a thickness of the axially lowest layer, is smaller than a radius of the through hole of the secondary lowest layer of the laminated disc shaped layers by a length which is approximately equal to or larger than the maximum tolerated deviation in a lateral position of the second lowest layer relative to the lowest layer.

27. The optical disk motor as claimed in claim 25, wherein at least a surface of the abutting portion of the cone part is made of a resin material a frictional coefficient of which shows against the inner peripheral surface of the central through hole of the disc is smaller than a frictional coefficient of a metal material thereagainst.

28. The optical disk motor as claimed in claim 25, wherein the cone part is made of polyacetal resin or acetal resin.

29. The optical disk motor as claimed in claim 25, wherein the rotor holder comprises the cylindrical part and the cap part extending between the shaft and the cylindrical part, the cap part having the upper surface to which a chucking device including the cone part and the spring for holding the disk is secured, a rotational member including the rotor holder and rotating around the rotational axis;
   a fixed member having a bearing part for rotatably supporting the rotational member; and
   an armature facing the rotor magnet, the armature generating a driving force in a direction of the rotation around the rotational axis.

30. A disc driving device, comprising:
   the brushless motor as claimed in claim 29;
   a pickup mechanism for recording and reproduction information with respect to the disc;
   a clamp member for retaining the disc by sandwiching the disc between itself and the placement face;
   a disc movement mechanism for moving the disc to the placement surface; and
   a housing cabinet for housing the pickup mechanism, the clamp mechanism and the disc movement mechanism.

* * * * *